United States Patent
Sakai

(10) Patent No.: US 7,057,497 B2
(45) Date of Patent: Jun. 6, 2006

(54) SECURITY DEVICE

(75) Inventor: Naoki Sakai, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 222 days.

(21) Appl. No.: 10/623,610

(22) Filed: Jul. 22, 2003

(65) Prior Publication Data

US 2004/0135683 A1    Jul. 15, 2004

(30) Foreign Application Priority Data

Jul. 26, 2002    (JP)    ............................ 2002-217995

(51) Int. Cl.
*B60R 25/10*    (2006.01)

(52) U.S. Cl. ..................... 340/426.27; 340/438; 367/93

(58) Field of Classification Search ........... 340/426.27, 340/425.5, 426.1, 429, 426.15, 426.23, 438, 340/550, 541; 367/93
See application file for complete search history.

(56) References Cited

U.S. PATENT DOCUMENTS 4,857,912 A  *  8/1989  Everett et al. ............... 340/508
5,117,220 A  *  5/1992  Marino et al. ............... 340/550
5,376,919 A  *  12/1994  Rickman ..................... 340/544
5,510,765 A  *  4/1996  Madau ........................ 340/541
5,680,096 A  *  10/1997  Grasmann ............... 340/426.27
5,990,786 A  *  11/1999  Issa et al. .................... 340/429
6,028,509 A  *  2/2000  Rice ........................... 340/449

FOREIGN PATENT DOCUMENTS

| JP | A 2000-6763 | 1/2000 |
| JP | A-2000-57444 | 2/2000 |
| JP | A 2000-185629 | 7/2000 |

* cited by examiner

Primary Examiner—Phung T. Nguyen
(74) Attorney, Agent, or Firm—Oliff & Berridge, PLC

(57) ABSTRACT

A security device includes an impact sensing unit for sensing an impact, a sound pressure sensing unit for sensing a sound pressure, an abnormal degree determination unit for determining an abnormal degree based on a level of an impact sensing signal sensed by the impact sensing unit and a level of a sound pressure sensing signal sensed by the sound pressure sensing unit, and an alerting process unit for performing a predetermined alerting process based on a determination result of the abnormal degree by the abnormal degree determination unit.

11 Claims, 12 Drawing Sheets

SECURITY DEVICE

The present disclosure relates to the subject matter contained in Japanese Patent Application No. 2002-217995 filed on Jul. 26, 2002, which is incorporated herein by reference in its entirety.

BACKGROUND OF THE INVENTION

1. Field of the Invention

The present invention relates to a security device, and more particularly to a security device for performing an alerting process by sensing an abnormal condition such as a break-into a room using illegal means.

2. Description of the Related Art

In a conventional security device includes an abnormality detecting sensor consists of an impact sensor alone, which is at low cost and has a relatively excellent detecting sensitivity. The impact sensor can sense even a relatively slight impact against a window glass or a vehicle body at high sensitivity. As a result, this abnormality detecting sensor can be sensitive to an impact caused by a pedestrian who touches the vehicle by mistake when the vehicle is parked in a urban area where many pedestrians walk, or a vibration caused by a strong wind or heavy rain, for example, but not an illegal intrusion act into the compartment of the vehicle, resulting in a problem that many false alarms arise.

SUMMARY OF THE INVENTION

The invention has been achieved in view of the above-problems. It is an object of the invention to provide a security device for determining correctly an abnormal degree of an illegal break-into the compartment of the vehicle using illegal means, in which no false alarm is produced.

In order to achieve the above object, according to a first aspect of the invention, a security device includes an impact sensing unit, a sound pressure sensing unit, an abnormal degree determination unit, and an alerting process unit. The impact sensing unit senses an impact to output an impact sensing signal. The sound pressure sensing unit senses a sound pressure to output a sound pressure sensing signal. The abnormal degree determination unit determines an abnormal degree on the basis of a level of the impact sensing signal and a level of the sound pressure sensing signal to output a determination result. The alerting process unit performs a predetermined alerting process on the basis of the determination result.

In the first aspect, the abnormal degree is determined based on a combination of the level of an impact sensing signal sensed by the impact sensing unit and the level of a sound pressure sensing signal sensed by the sound pressure sensing unit. Therefore, the precision of abnormal determination is greatly improved over the conventional single impact sensing unit. A precise alerting process according to the abnormal degree can be performed without raising the false alarm.

Also, according to the second aspect of the invention, in the first aspect, the abnormal degree determination unit concludes that an illegal break-in is conducted when the level of the impact sensing signal is not less than a first predetermined value and the level of the sound pressure sensing signal is not less than a second predetermined value.

In the second aspect, when there is a large impact applied from the outside, in which both the level of the impact sensing signal and the level of the sound pressure sensing signal are determined to be abnormal, the abnormal degree determination unit determines that the abnormal is caused by an illegal break-in. Therefore, the illegal break-in is correctly discriminated.

Also, according to a third aspect, in the second aspect, the alerting process unit performs an alerting process corresponding to the illegal break-in.

In the third aspect, an effective alerting process corresponding to the illegal break-in is performed to raise a precise alarm to the illegal intruder, thereby increasing the effect of deterring the break-in.

Also, according to a fourth aspect of the invention, in the first aspect, the abnormal degree determination unit concludes that the abnormal degree is not so severe as to lead to an illegal break-in when the level of the impact sensing signal is not less than a first predetermined value and the level of the sound pressure sensing signal is less than a second predetermined value.

In the fourth aspect, the abnormal degree determination unit determines that the abnormal degree is not so severe as to lead to the illegal break-in when there is applied from the outside an impact in which the level of the impact sensing signal is not less than or equal to a predetermined value, and the level of the sound pressure sensing signal is smaller than a predetermined value is applied from the outside. Therefore, when the pedestrian touches by mistake, or a weak impact of mischief is applied, the abnormal degree is correctly discriminated.

Also, according to a fifth aspect of the invention, in the fourth aspect, when the abnormal degree determination unit concludes that the abnormal degree is not so severe as to lead to the illegal break-in, the alerting process unit performs an alerting process with prealarm.

In the fifth aspect, the alerting process with prealarm is conducted to raise a precise alarm to the pedestrian who touches the vehicle or the person who gets into mischief, thereby increasing the effect of deterring the mischief act.

Also, according to a sixth aspect of the invention, a security device includes an impact sensing unit, a sound pressure sensing unit, an impacted object determination unit, and an alerting process unit. The impact sensing unit senses an impact to output an impact sensing timing. The sound pressure sensing unit senses a sound pressure to output a sound pressure sensing timing. The impacted object determination unit determines an impacted object on the basis of the impact sensing timing and the sound pressure sensing timing to output a determination result. The alerting process unit performs a predetermined alerting process on the basis of a determination result.

In the sixth aspect, the impacted object is determined based on a difference between the impact sensing timing of the impact sensing unit and the sound pressure sensing timing of the sound pressure sensing unit, namely, based on a difference in propagation speed between the impact and the sound pressure. For example, a case is supposed in which a window glass is broken to break into the vehicle or the house. It is possible to correctly discriminate between a strong impact to break the window glass and a weak impact not to break the window glass or an impact on other than the window glass. Therefore, a precise alerting process corresponding to the discriminated impacted object is conducted without raising the false alarm.

Also, according to a seventh aspect of the invention, in the sixth aspect, when the impacted object determination unit concludes that the impact sensing timing is earlier than the sound pressure sensing timing, the impacted object determination unit concludes that the impacted object is a glass.

In the seventh aspect, when a strong impact to break the glass window is applied, the impact sensing timing is earlier than the sound pressure sensing timing. Thus, the impacted object determination unit correctly discriminates that the impact is caused by an intrusion act of breaking the glass window.

Also, according to an eighth aspect of the invention, in the seventh aspect, when the impacted object determination unit concludes that the impacted object is the glass, the alerting process unit performs an alerting process corresponding to a breakage of the glass.

In the eighth aspect, an effective alerting process corresponding to the breakage of the glass is performed to raise a precise alarm to the person trying to intrude by breaking the glass, thereby increasing the effect of deterring the intrusion act.

Also, according to a ninth aspect of the invention, in the sixth aspect, when the impacted object determination unit concludes that the sound pressure sensing timing is earlier than the impact sensing timing, the impacted object determination unit concludes that the impacted object is other than a glass.

In the ninth aspect, when an impact is applied to other than the glass, the sound pressure sensing timing is earlier than the impact sensing timing. Thus, the impacted object determination unit correctly determines that the impact is applied to other than the glass.

Also, according to a tenth aspect of the invention, in the ninth aspect, when the impacted object determination unit concludes that the impacted object is other than the glass, the alerting process unit performs an alerting process corresponding to a portion other than the glass.

In the tenth aspect, an effective alerting process corresponding to a portion other than the glass is performed to raise a precise alarm to the person applying an impact to other than the glass, thereby increasing the effect of deterring the intrusion act.

Also, according to an eleventh aspect of the invention, a security device includes an impact sensing unit, a sound pressure sensing unit, an abnormal degree determination unit, an impacted object determination unit, and an alerting process unit. The impact sensing unit senses an impact to output an impact sensing signal and an impact sensing timing. The sound pressure sensing unit senses a sound pressure to output a sound pressure sensing signal and a sound pressure sensing timing. The abnormal degree determination unit determines an abnormal degree on the basis of a level of the impact sensing signal and a level of the sound pressure sensing signal to output a first determination result. The impacted object determination unit determines an impacted object on the basis of the impact sensing timing and the sound pressure sensing timing to output a second determination result. The alerting process unit performs a predetermined alerting process on the basis of the first determination result and the second determination result.

In the eleventh aspect, the abnormal degree is determined based on a combination of the level of the impact sensing signal sensed by the impact sensing unit and the level of the sound pressure sensing signal sensed by the sound pressure sensing unit. The impacted object is determined on the basis of a difference between the impact sensing timing of the impact sensing unit and the sound pressure sensing timing of the sound pressure sensing unit, namely, on the basis of a difference in propagation speed between the impact and the sound pressure. Accordingly, the precision of determination is greatly improved over the conventional single impact sensing unit, and a precise alerting process according to the abnormal degree and the impacted object is performed without raising the false alarm owing to an enhanced precision of determination.

DETAILED DESCRIPTION OF THE PREFERRED EMBODIMENTS

The preferred embodiments of a security device according to the present invention will be described below with reference to the accompanying drawings.

Figure 1:
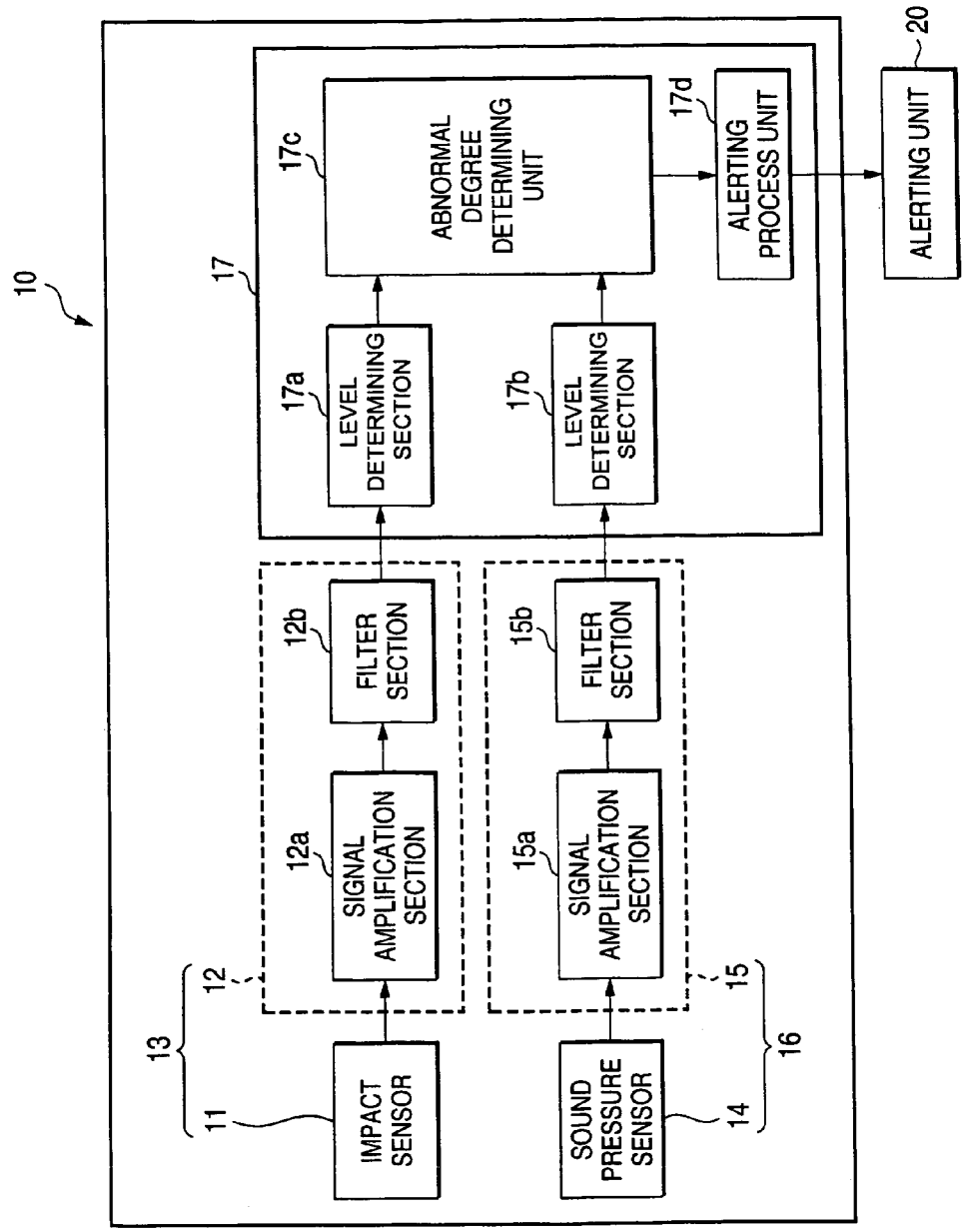
FIG. 1 is a block diagram schematically showing the essence of an in-vehicle security device according to an embodiment (1) of the present invention.

FIG. 1 is a block diagram schematically showing the essence of an in-vehicle security device according to an embodiment (1) of the invention.

In FIG. 1, reference numeral 10 denotes an in-vehicle security device. The in-vehicle security device 10 includes an impact sensing unit 13 having an impact sensor 11 and a signal processing section 12, a sound pressure sensing unit 16 having a sound pressure sensor 14 and a signal processing section 15, and a microcomputer 17, which is connected to an alerting unit 20.

The impact sensor 11 senses an impact or vibration applied from the outside, and includes a semiconductor type pressure sensitive sensor for outputting a voltage value in accordance with an applied impact level. The impact sensed by the impact sensor 11 is converted into a signal wave and output it to the signal processing section 12.

The signal processing section 12 includes a signal amplification section 12a for amplifying the signal wave output from the impact sensor 11 to a predetermined level and a filter section 12b for passing a signal of predetermined frequency components, which is required to determine the impact level from the signal wave amplified by the signal amplification section 12a.

The sound pressure sensor 14 senses a sound pressure propagated through the inside of vehicle, and includes a microphone or a piezoelectric element for outputting a voltage value in accordance with a sensed sound pressure level. The sound pressure sensed by the sound pressure sensor 14 is converted into a signal wave and output it to the signal processing section 15.

The signal processing section 15 includes a signal amplification section 15a for amplifying the signal wave output from the sound pressure sensor 14 to a predetermined level and a filter section 15b for passing a signal in a detection frequency band from the signal wave amplified by the signal amplification section 15a.

The microcomputer 17 includes a level determining section 17a, a level determining section 17b, an abnormal degree determining unit 17c, and an alerting process unit 17d. The level determining section 17a determines the level of the impact sensor signal that has passed through the filter section 12b, which has a threshold of a predetermined energy value. The level determining section 17b determines the level of the sound pressure sensor signal that has passed through the filter section 15b, which has a threshold of a predetermined energy value. The abnormal degree determining unit 17c receives a determination signal output from the level determining section 17a and a determination signal output from the level determining section 17b to determine an abnormal degree based on the received signals (vehicle break-in directly linking to the vehicle theft has a high abnormal degree and mischief to a body or a touch by the pedestrian has a low abnormal degree). The alerting process unit 17d conducts a predetermined alerting process with respect to the alerting unit 20 based on a determination result of the abnormal degree by the abnormal degree determining unit 17c.

The alerting unit 20 has a drive circuit (not shown), and an alarm device such as a horn or a siren, a voice output device for making a warning in voice, a lamp, or a combination thereof.

The in-vehicle security device 10 may be installed at a predetermined location within a vehicle compartment (under a dash board). However, it is preferable that the in-vehicle security device 10 is installed at a position equivalently distance from the front and back windows and from left and right windows in the vehicle, for example, near a center console BOX in the center of the vehicle compartment, to reduce the influence due to a sensitivity difference depending on the positions where the impact sensor 11 and the sound pressure sensor 14 are installed.

Referring to the flowcharts of FIGS. 2 to 4, an operation of the in-vehicle security device 10 made by the microcomputer 17 according to the embodiment (1) will be described below.

Figure 2:
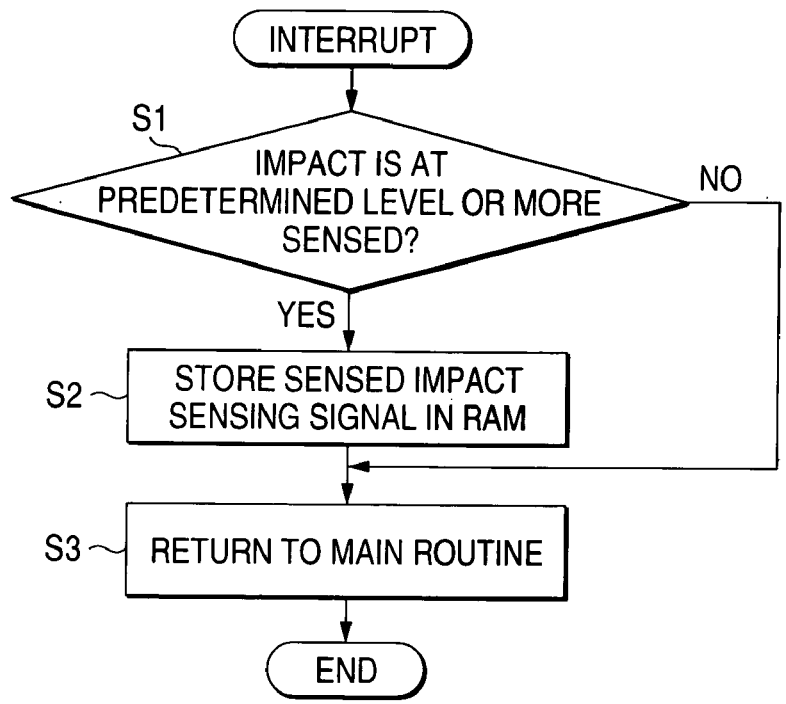
FIG. 2 is a flowchart showing an interrupt processing operation made by a microcomputer in the in-vehicle security device according to the embodiment (1).

FIG. 2 is a flowchart showing an interrupt processing operation made by the microcomputer 17 when the impact sensor 11 senses an impact.

First of all, at step S1, it is determined whether or not the impact sensor 11 senses an impact at a predetermined level or more. If yes, the operation proceeds to step S2.

At step S2, an impact sensing signal detected is stored in a RAM (not shown) within the microcomputer 17. Then, the operation proceeds to step S3. At step S3, the operation returns to a main routine shown in FIG. 4. Then, the operation is ended.

On the other hand, if there is no impact sensed greater than or equal to the predetermined level at step S1, the operation proceeds to step S3. Thereafter, the operation is ended.

Figure 3:
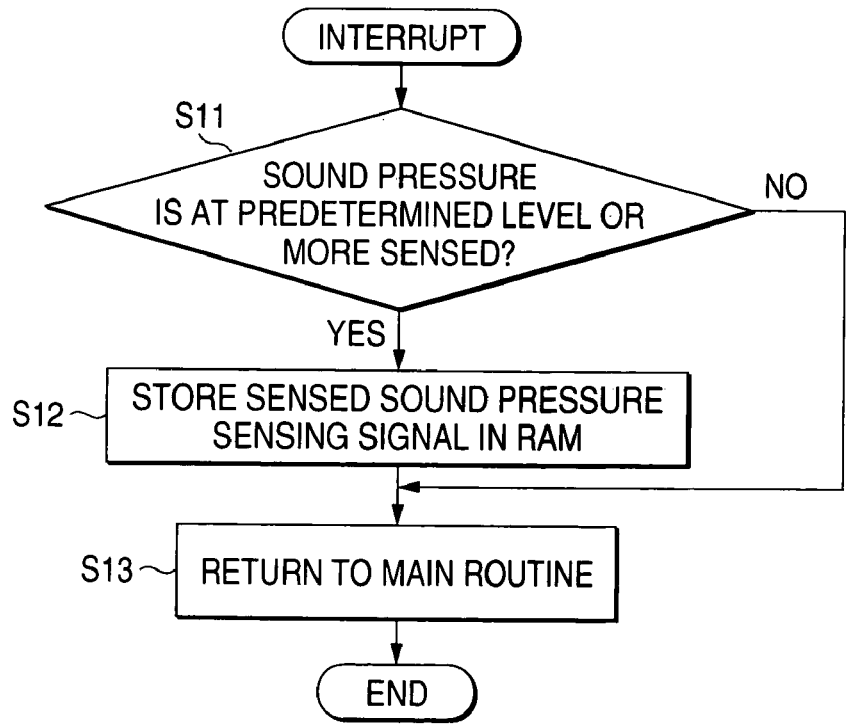
FIG. 3 is a flowchart showing an interrupt processing operation made by the microcomputer in the in-vehicle security device according to the embodiment (1).

FIG. 3 is a flowchart showing an interrupt processing operation made by the microcomputer 17 when the sound pressure sensor 14 senses a sound pressure.

At step S11 it is determined whether or not the sound pressure sensor 14 senses a sound pressure greater than or equal to the predetermined level. If yes, the operation proceeds to step S12.

At step S12, a sound pressure sensing signal detected is stored in the RAM within the microcomputer 17. Then, the operation proceeds to step S13. At step S13, the operation returns to the main routine shown in FIG. 4. Then, the operation is ended.

On the other hand, if there is no sound pressure sensed greater than or equal to the predetermined level at step S11, the operation proceeds to step S13. Thereafter, the operation is ended.

Figure 4:
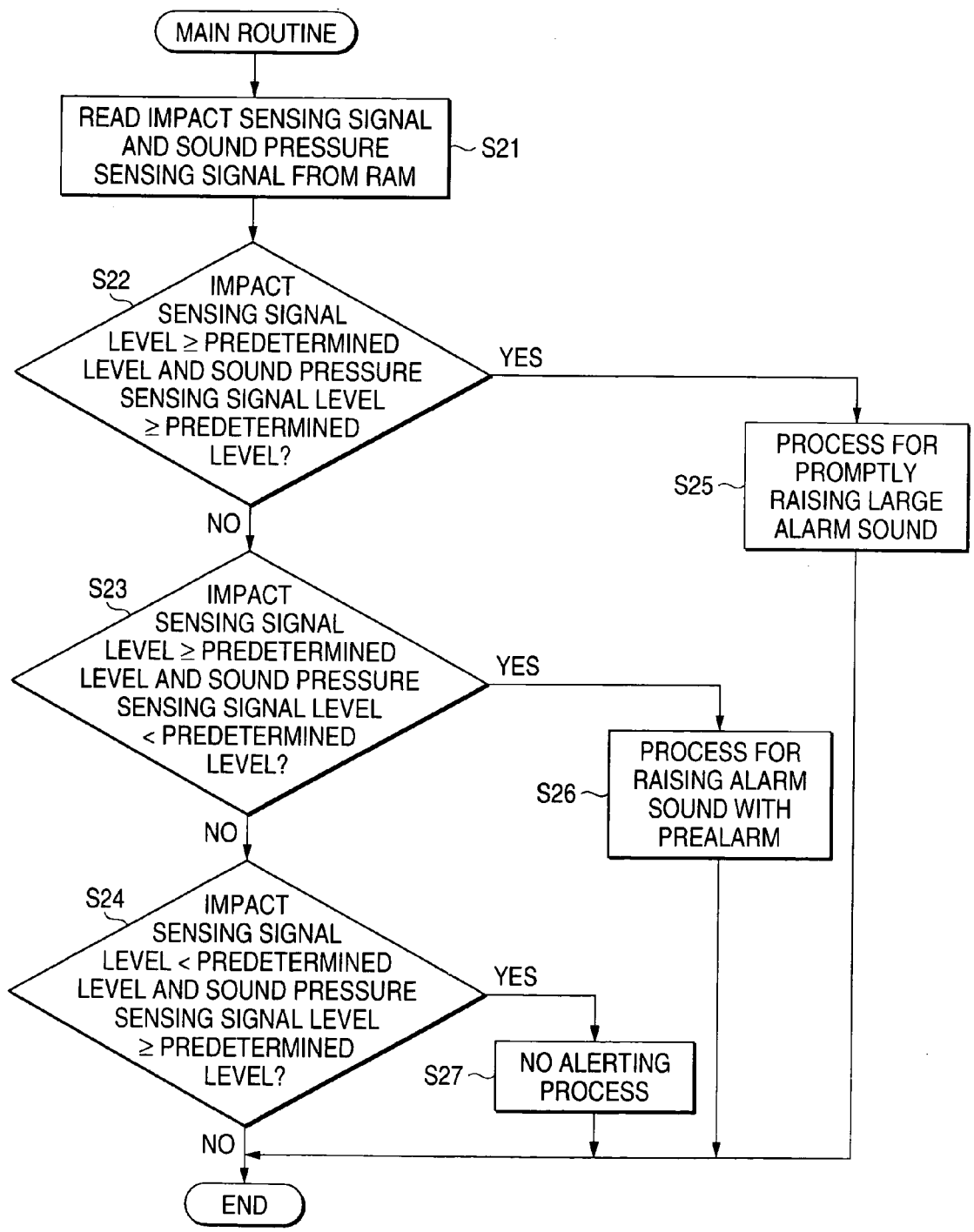
FIG. 4 is a flowchart showing a processing operation made by the microcomputer in the in-vehicle security device according to the embodiment (1).

FIG. 4 is a flowchart showing the main routine of an abnormality determination process made by the microcomputer 17.

First of all, at step S21, the impact sensing signal of the impact sensor 11 and the sound pressure sensing signal of the sound pressure sensor 14 are read from the RAM. Then, the operation proceeds to step S22.

At step S22, it is determined whether or not the level of the impact sensing signal is greater than or equal to a predetermined level (an impact level strong enough to break the window glass) or more, and the level of the sound pressure sensing signal of the sound pressure sensor 14 is greater than or equal to a predetermined level (a sound pressure level strong enough to break the window glass). If the level of the impact sensing signal is greater than or equal to the predetermined level and the level of the sound pressure sensing signal is greater than or equal to the predetermined level, namely, there is a strong impact sensed due to an illegal break-into the vehicle compartment, the operation proceeds to step S25.

At step S25, a process of promptly raising a large alarm sound to cause a person making the illegal break-in to abandon the break-in is performed, and then the operation is ended.

On the other hand, at step S22, if the level of the impact sensing signal is not greater than or equal to the predetermined level or the level of the sound pressure sensing signal is not greater than or equal to the predetermined level, the operation proceeds to step S23.

At step S23, it is determined whether or not the level of the impact sensing signal is greater than or equal to the predetermined level, and the level of the sound pressure sensing signal is smaller than the predetermined level. If the level of the impact sensing signal is greater than or equal to the predetermined level and the level of the sound pressure sensing signal is smaller than the predetermined level, namely, there is a relatively weak impact sensed due to a touch by the pedestrian or a mischief on the body, the operation proceeds to step S26.

At step S26, a process for raising a small prealarm sound is performed to discourage or threaten the pedestrian touching the vehicle or the person making a mischief on the body. Then, the operation is ended.

On the other hand, at step S23, if the level of the impact sensing signal is not greater than or equal to the predetermined level or the level of the sound pressure sensing signal is not smaller than the predetermined level, the operation proceeds to step S24.

At step S24, it is determined whether or not the level of the impact sensing signal is smaller than the predetermined level, and the level of the sound pressure sensing signal is greater than or equal to the predetermined level. If the level of the impact sensing signal is smaller than the predetermined level and the level of the sound pressure sensing signal is greater than or equal to the predetermined level, namely, it is concluded that the vehicle such as a large truck or a muffler remodeled car making a large noise has passed nearzby, the operation proceeds to step S27.

At step S27, no alerting process is performed, because there is no direct damage such as break-into the vehicle in this case.

On the other hand, at step S24, if the level of the impact sensing signal is not smaller than the predetermined level or the level of the sound pressure sensing signal is not greater than or equal to the predetermined level, the operation is ended.

In the in-vehicle security device 10 according to the embodiment (1), because the abnormal degree is determined based on a combination of the level of the impact sensing signal sensed by the impact sensing unit 13 and the level of the sound pressure sensing signal sensed by the sound pressure sensing unit 16, the precision of abnormality determination is greatly improved without raising the false alarm.

Also, when there is a large impact applied from the outside in which the level of the impact sensing signal and the level of the sound pressure sensing signal are determined to be abnormal, the abnormal degree determining unit 17c determines that the abnormality is caused by an illegal break-in (especially an illegal breaking the window glass), whereby the illegal break-in is correctly discriminated.

In this case, the alerting process unit 17d performs an effective alerting process corresponding to the illegal break-in to raise a precise alarm to the illegal break-in, thereby increasing the effect of deterring the intrusion act.

Also, when there is a small impact applied from the outside in which the level of the impact sensing signal is greater than or equal to the predetermined value and the level of the sound pressure sensing signal is small than the predetermined value, the abnormal degree determining unit 17c determines that the impact is not so strong as to lead to the illegal break-in, a weak impact caused by the pedestrian touching by mistake or a mischief is correctly discriminated.

In this case, the alerting process unit 17d performs the alerting process with prealarm to raise a precise alarm to discourage the pedestrian touching the vehicle or the person getting into mischief to do the mischief.

Figure 5:
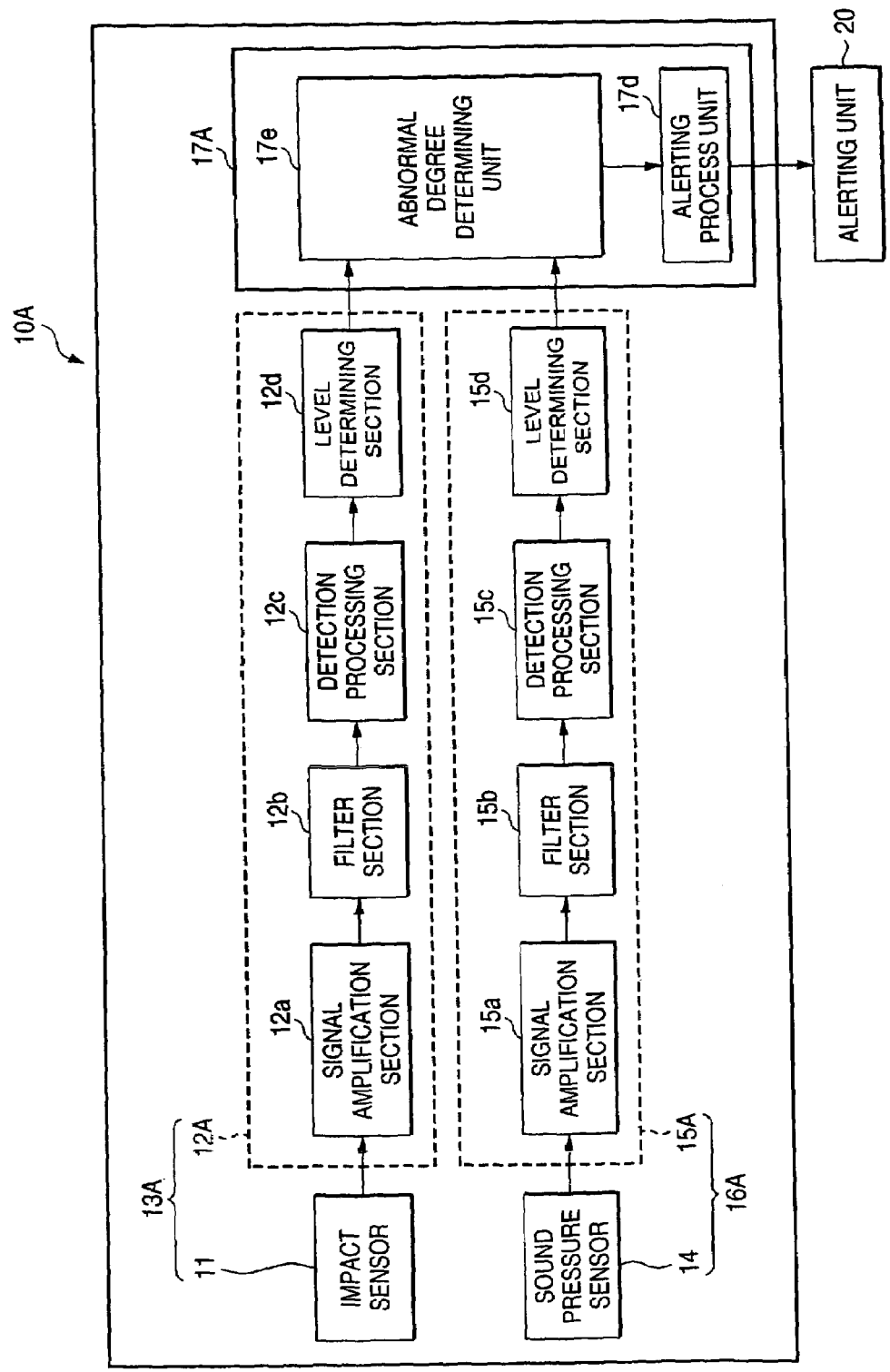
FIG. 5 is a block diagram schematically showing the essence of an in-vehicle security device according to an embodiment (2) of the invention.

FIG. 5 is a block diagram schematically showing the essence of an in-vehicle security device according to an embodiment (2) of the invention. The in-vehicle security device 10A of the embodiment (2) is almost the same as the in-vehicle security device 10 of FIG. 1, except for a signal processing section 12A making up impact sensing unit 13A, a signal processing section 15A making up sound pressure sensing unit 16A, and a microcomputer 17A. Here, different numerals are attached to the components having different functions, and the description of other components is omitted.

The signal processing section 12A includes a signal amplification section 12a, a filter section 12b, a detection processing section 12c, and a level determining section 12d. The detection processing section detects an impact sensor signal passing through the filter section 12b. The level determining section 12d compares a signal level detected by the detection processing section 12c and a preset threshold voltage, and outputs an impact sensing signal to the microcomputer 17A if the voltage value of the sensing signal is greater than or equal to the threshold voltage.

The signal processing section 15A includes a signal amplification section 15a, a filter section 15b, a detection processing section 15c, and a level determining section 15d. The detection processing section 15c detects a sound pressure sensor signal passing through the filter section 15b. The level determining section 15d compares a signal level detected by the detection processing section 15c, and outputs a sound pressure sensing signal to the microcomputer 17A if the voltage value of the sensing signal is greater than or equal to the threshold voltage.

The microcomputer 17A includes an abnormal degree determining unit 17e and an alarm process unit 17d. The abnormal degree determining unit 17e determines the abnormal degree on the basis of the impact sensing signal output from the signal processing section 12A and the sound pressure sensing signal output from the signal processing section 15A. The alerting process unit 17d performs a predetermined alerting process with respect to the alerting unit 20 on the basis of the determination result by the abnormal degree determining unit 17e.

Referring to the flowcharts of FIGS. 6 to 8, a processing operation of the microcomputer 17A in the in-vehicle security device 10A according to the embodiment (2) will be described below.

Figure 6:
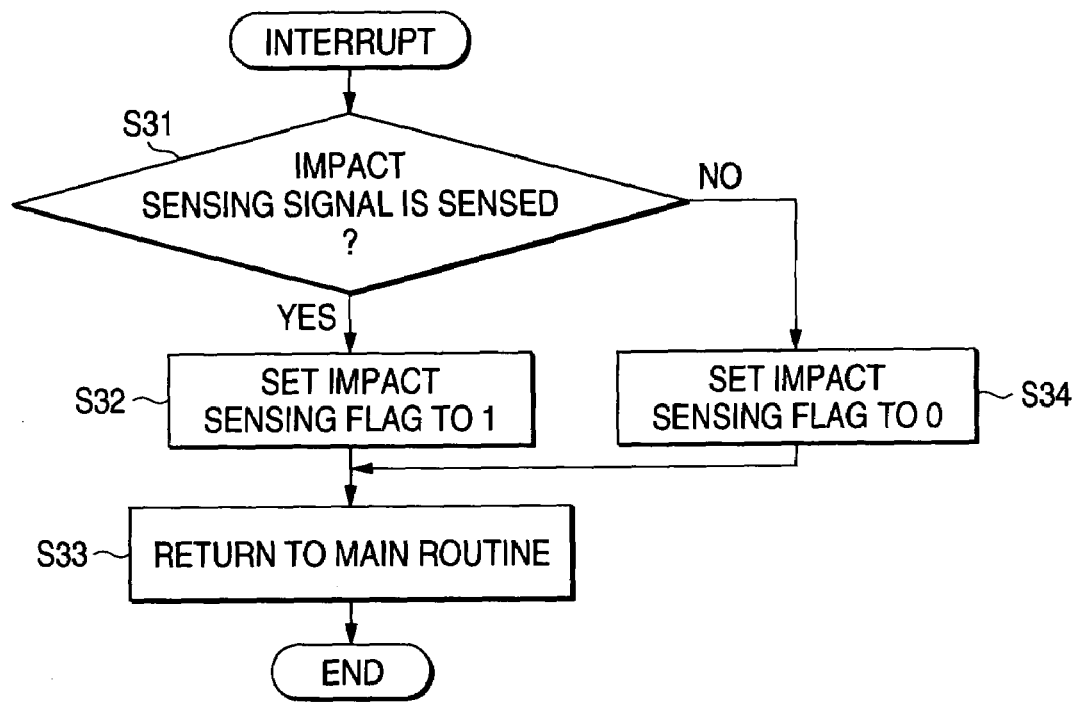
FIG. 6 is a flowchart showing an interrupt processing operation made by the microcomputer in the in-vehicle security device according to the embodiment (2).

FIG. 6 shows an interrupt process that the microcomputer 17A performs when the impact sensor 11 senses an impact. First of all, at step S31, it is determined whether or not an impact sensing signal output from the signal processing section 12A is sensed. If the impact sensing signal is sensed, the operation proceeds to step S32.

At step S32, an impact detection flag indicating the detection of the impact sensing signal is set to 1. Then, the operation proceeds to step S33. At step S33, the operation is returned to a main routine of FIG. 8. Then, the operation is ended.

On the other hand, at step S31, if no impact sensing signal is sensed, the operation proceeds to step S34, where the impact detection flag is set to 0. Then, the operation proceeds to step S33.

Figure 7:
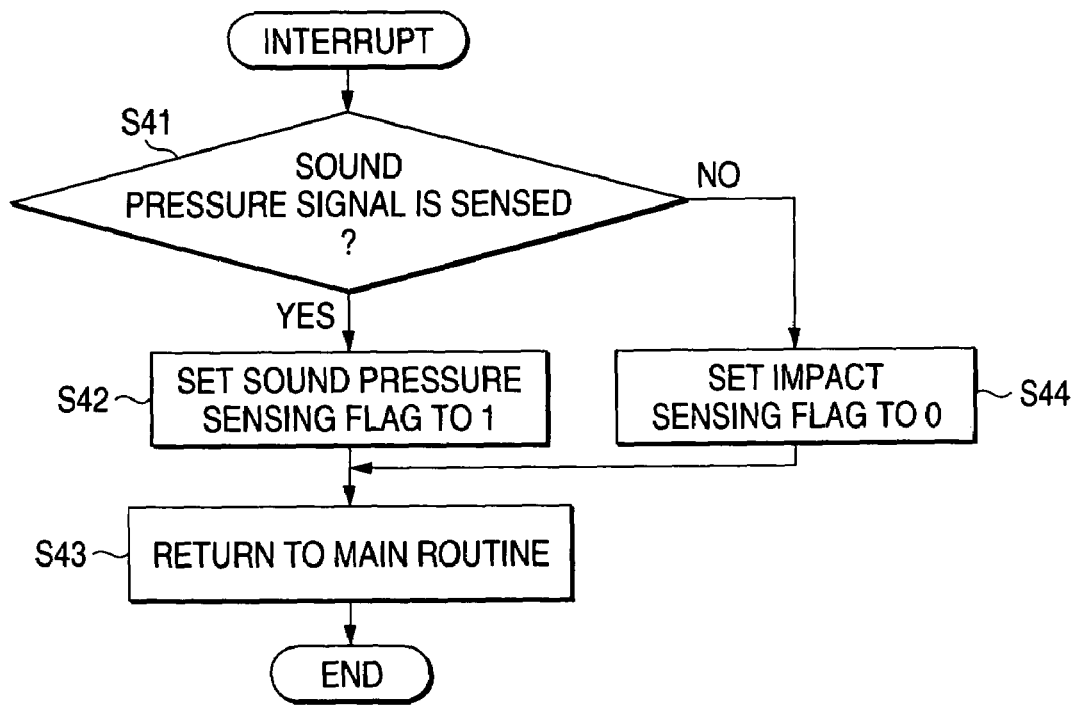
FIG. 7 is a flowchart showing an interrupt processing operation made by the microcomputer in the in-vehicle security device according to the embodiment (2).

FIG. 7 shows an interrupt process made by the microcomputer when the sound pressure sensor 14 senses a sound pressure.

First of all, at step S41, it is determined whether or not a sound pressure sensing signal output from the signal processing section 15A is sensed. If the sound pressure sensing signal is sensed, the operation proceeds to step S42.

At step S42, a sound pressure detection flag indicating the detection of the sound pressure sensing signal is set to 1. Then the operation proceeds to step S43. At step S43, the operation is returned to the main routine. Then, the operation is ended.

On the other hand, at step S41, if no sound pressure sensing signal is sensed, the operation proceeds to step S44, where the sound pressure detection flag is set to 0. Then, the operation proceeds to step S43.

Figure 8:
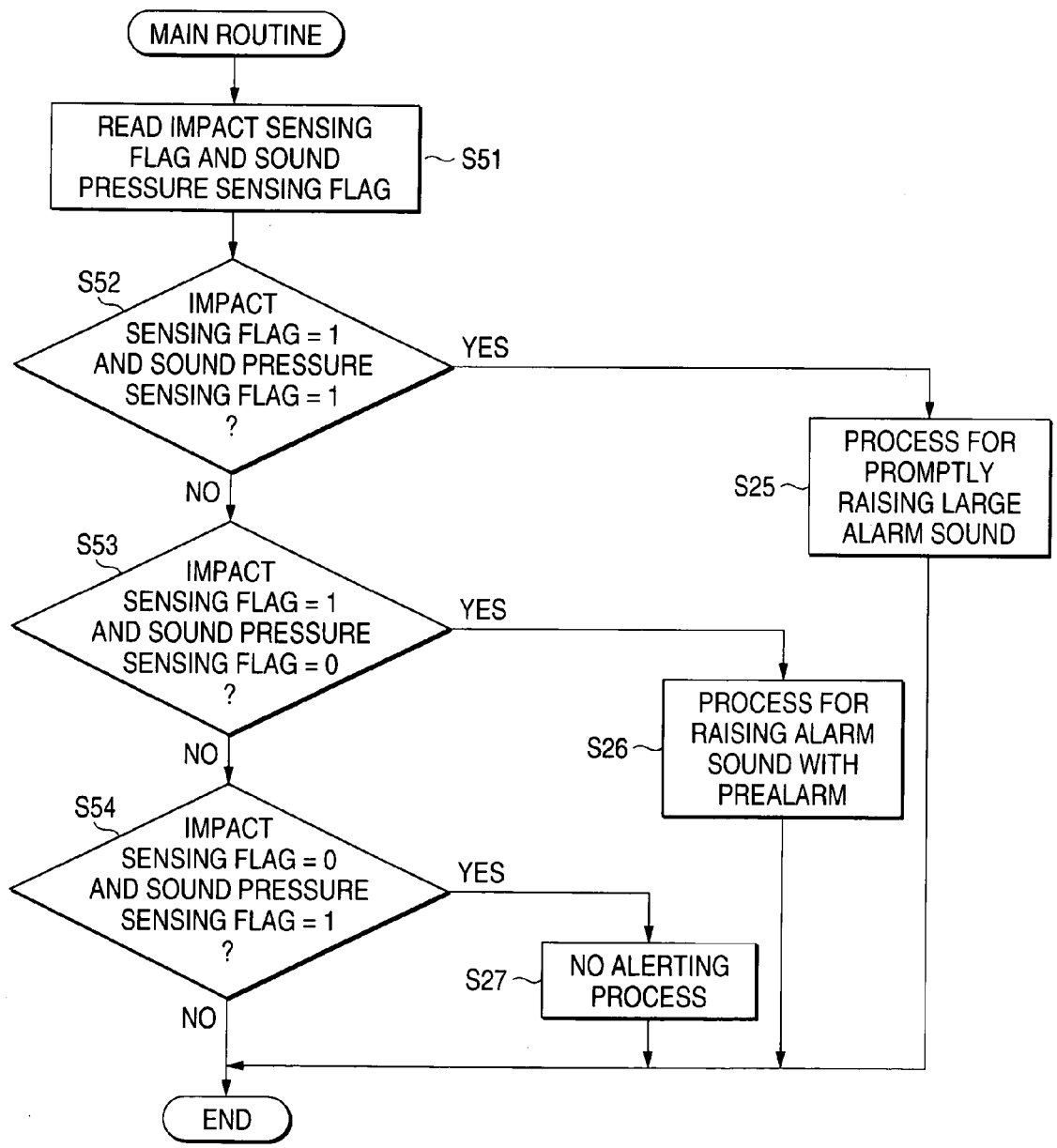
FIG. 8 is a flowchart showing a processing operation made by the microcomputer in the in-vehicle security device according to the embodiment (2).

FIG. 8 shows the main routine for the abnormality determining process performed by the microcomputer 17A.

In the processing operation of the main routine of FIG. 8, the same steps (steps S25 to S27) as in the main routine of FIG. 4 are designated by the same signs, and not described here.

First of all, at step S51, the impact detection flag and the sound pressure detection flag are read out. Then, the operation proceeds to step S52.

At step S52, it is determined whether or not the impact detection flag is 1 and the sound pressure detection flag is 1. If it is concluded that the impact detection flag is 1 and the sound pressure detection flag is 1, namely, it is concluded that a strong impact caused by an illegal break-into the vehicle is sensed, the operation proceeds to step S25.

At step S25, an alarm sound against the illegal break-in is promptly raised. Then, the operation is ended.

On the other hand, at step S52, if the impact detection flag is not 1 or the sound pressure detection flag is not 1, the operation proceeds to step S53.

At step S53, it is determined whether or not the impact detection flag is 1 and the sound pressure detection flag is 0. If it is concluded that the impact detection flag is 1 and the sound pressure detection flag is 0, namely, it is concluded that a weak impact caused by a touch or a mischief by the pedestrian is sensed, the operation proceeds to step S26.

At step S26, a small alarm sound with prealarm is raised. Then, the operation is ended.

On the other hand, at step S53, if it is concluded that the impact detection flag is not 1 or the sound pressure detection flag is not 0, the operation proceeds to step S54.

At step S54, it is determined whether or not the impact detection flag is 0 and the sound pressure detection flag is 1. If it is concluded that the impact detection flag is 0 and the sound pressure detection flag is 1, namely, it is concluded that the vehicle such as a large truck or a muffler remodeled car making a large noise has passed nearby, the operation proceeds to step S27.

At step S27, no alerting process is performed, because there is no direct damage such as a break-into the vehicle in this case. Then, the operation is ended.

On the other hand, at step S54, if it is concluded that the impact detection flag is not 0 or the sound pressure detection flag is not 1, the operation is ended.

The in-vehicle security device 10A according to the embodiment (2) can achieve the almost same effects as the in-vehicle security device 10 according to the embodiment (1). Furthermore, it is only necessary for the microcomputer 17A to determine the impact detection flag and the sound pressure detection flag. Therefore, it is not necessary to determine the level of waveform of the sensing signals output from the impact sensor 11 and the sound pressure sensor 14. The microcomputer 17A can be relieved from the load of the determination process.

Figure 9:
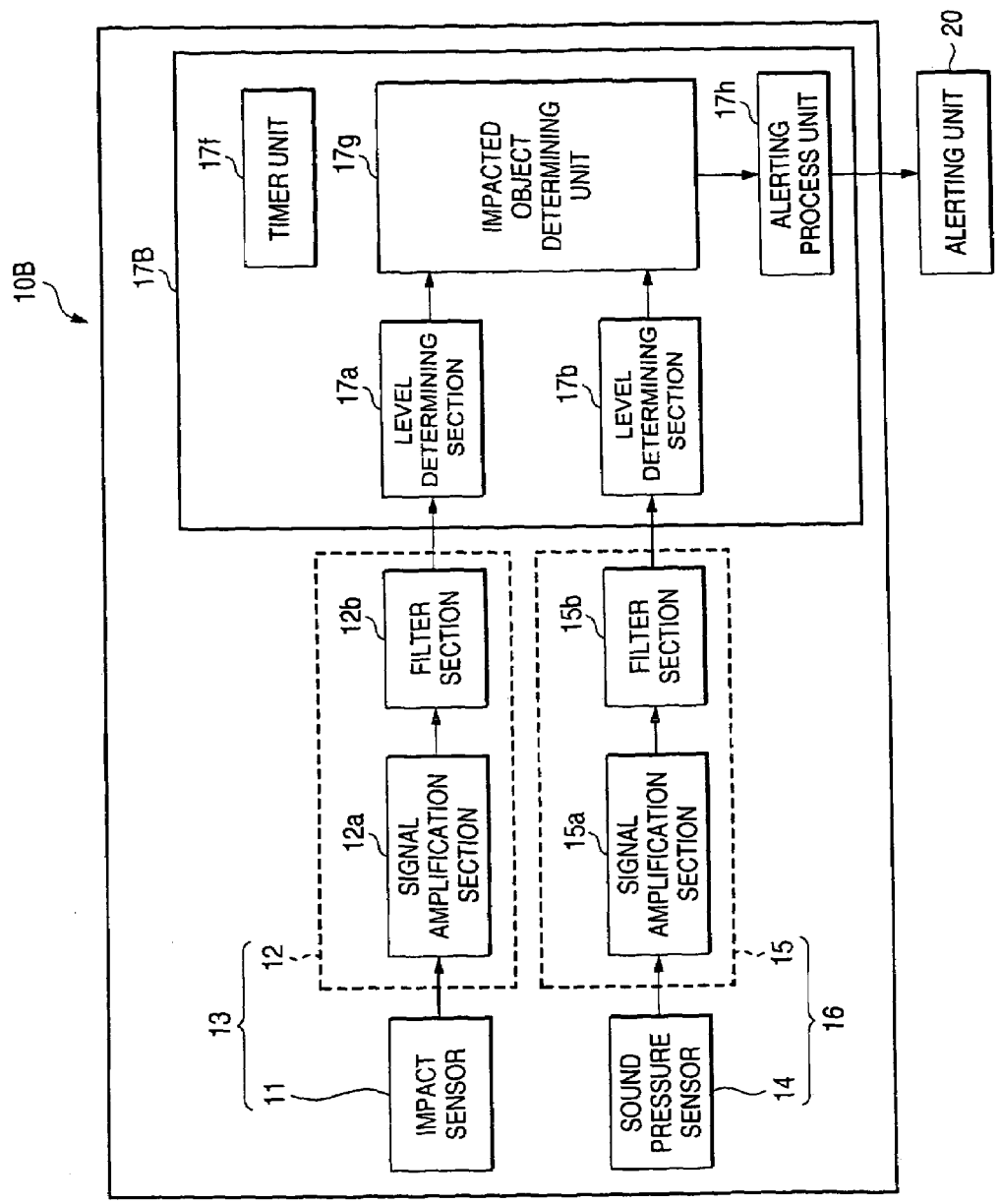
FIG. 9 is a block diagram schematically showing the essence of an in-vehicle security device according to an embodiment (3) of the invention.

FIG. 9 is a block diagram schematically showing the essence of an in-vehicle security device according to an embodiment (3) of the invention. The in-vehicle security device 10B according to the embodiment (3) has the almost same configuration as the in-vehicle security device 10 of FIG. 1, except for the microcomputer 17B. Here, in the microcomputer 17B having different functions, different components are designated by different signs, and the description of other components is omitted.

The microcomputer 17B includes a timer unit 17f, an impacted object determining unit 17g, and an alerting process unit 17h. The timer unit 17f measures an impact sensing timing when the level determining section 17a senses an impact at a predetermined level or more, and a sound pressure sensing timing when the level determining section 17b senses a sound pressure sensing timing at a predetermined level or more. The impacted object determining unit 17g determines an impacted object on the basis of the impact sensing timing and the sound pressure sensing timing measured by the timer unit 17f, namely, on the basis of a difference in propagation speed between the impact and the sound pressure. The alerting process unit 17h performs a predetermined alerting process on the basis of the determination result of the impacted object by the impacted object determining unit 17g.

Figure 10A:
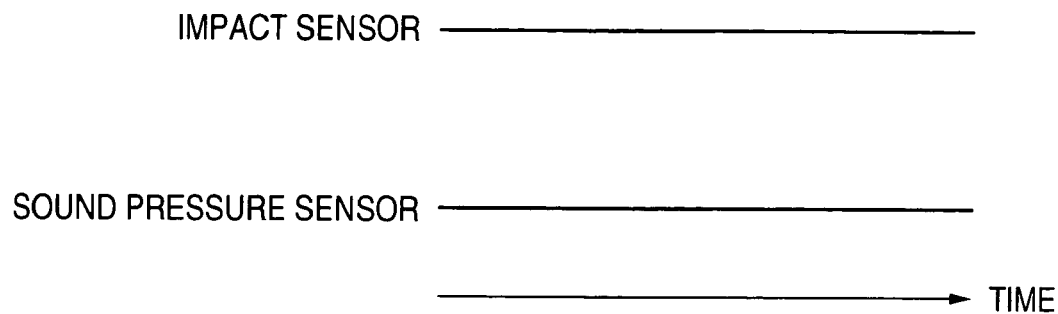
FIGS. 10A to 10C are timing charts showing various sensed states of an impact sensor and a sound pressure sensor for explaining an impacted object determining operation made by the microcomputer.
Figure 10B:
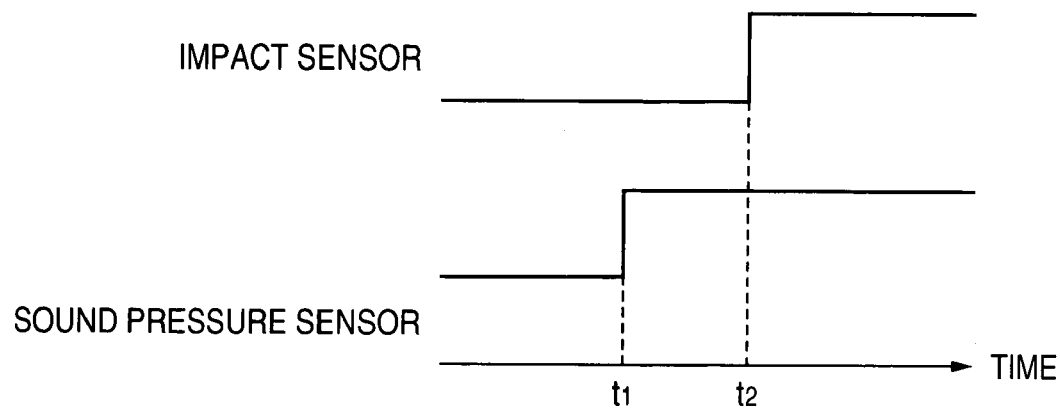
Figure 10C:
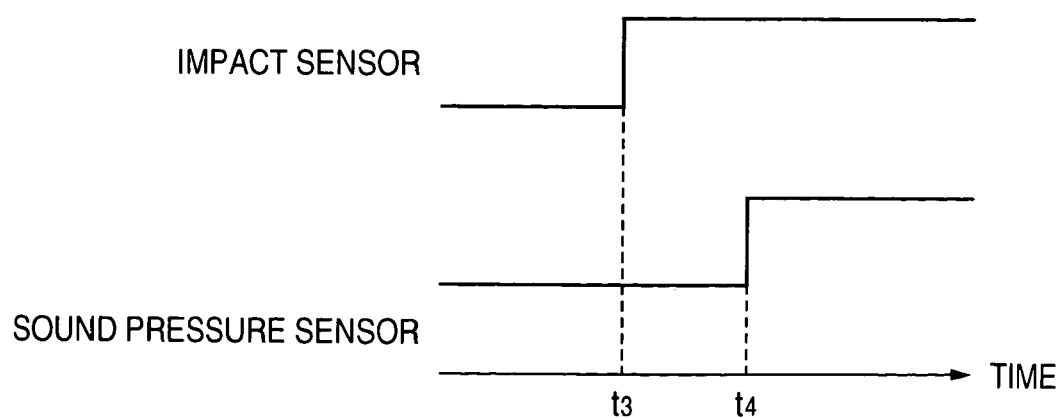

FIGS. 10A to 10C are timing charts showing various sensed states of the impact sensor 11 and the sound pressure sensor 14, for explaining an impacted object determining operation made by the microcomputer 17B.

FIG. 10A shows a sensed state where the impact sensor 11 and the sound pressure sensor 14 are not reactive. In this sensed state, the alerting process is not performed.

FIG. 10B shows a reaction in which the impact sensor 11 and the sound pressure sensor 14 indicate the predetermined level or more. In this sensed state, the detection timing (time $t_1$) of the sound pressure sensor 14 is earlier than the detection timing (time $t_2$) of the impact sensor 11. For example, when an impact is not so strong as to break the window glass of the vehicle, or an impact is applied on the body, this difference in propagation speed between the sound pressure and the impact takes place.

Accordingly, in this sensed state, it is judged that the impact is not caused by breaking the window glass to directly break into the vehicle, namely, that the impacted object is not the glass window. An alarm sound for sensing the body impact other than the glass window is raised.

FIG. 10C shows a reaction in which the impact sensor 11 and the sound pressure sensor 14 indicate the predetermined level or more. In this sensed state, the detection timing (time $t_3$) of the impact sensor 11 is earlier than the detection timing (time $t_4$) of the sound pressure sensor 14. For example, when an impact is so strong as to break the window glass of the vehicle, a difference in propagation speed between the sound pressure and the impact is caused.

Accordingly, in this sensed state, it is judged that the impact is caused by breaking the window glass to directly break into the vehicle, namely, that the impacted object is the glass window. An alarm sound for the time when the window glass is broken and the vehicle is broken into is raised.

Referring to the flowcharts of FIGS. 11 to 13, the processing operation made by the microcomputer 17B in the in-vehicle security device 10B according to the embodiment (3) will be described below.

Figure 11:
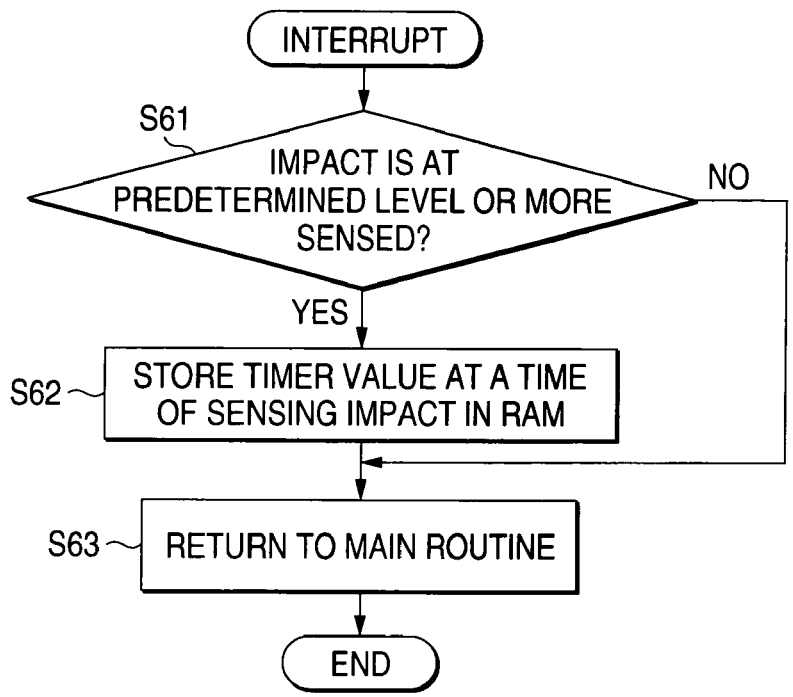
FIG. 11 is a flowchart showing an interrupt processing operation made by the microcomputer in the in-vehicle security device according to an embodiment (3) of the invention.

FIG. 11 shows an interrupt processing operation made by the microcomputer 17B when the impact sensor 11 senses an impact.

First of all, at step S61, it is determined whether or not the impact sensor 11 senses an impact at a predetermined level (a level at which abnormality is detected) or more. If the impact sensor senses the impact at the predetermined level or more, the operation proceeds to step S62.

At step S62, a timer value detected by the timer unit 17*f* when the impact is sensed is stored in a RAM. Then, the operation proceeds to step S63. At step S63, the operation is returned to a main routine. Then, the operation is ended.

On the other hand, at step S61, if the impact at the predetermined level or more is not sensed, the operation proceeds to step S63. Then, the operation is ended.

Figure 12:
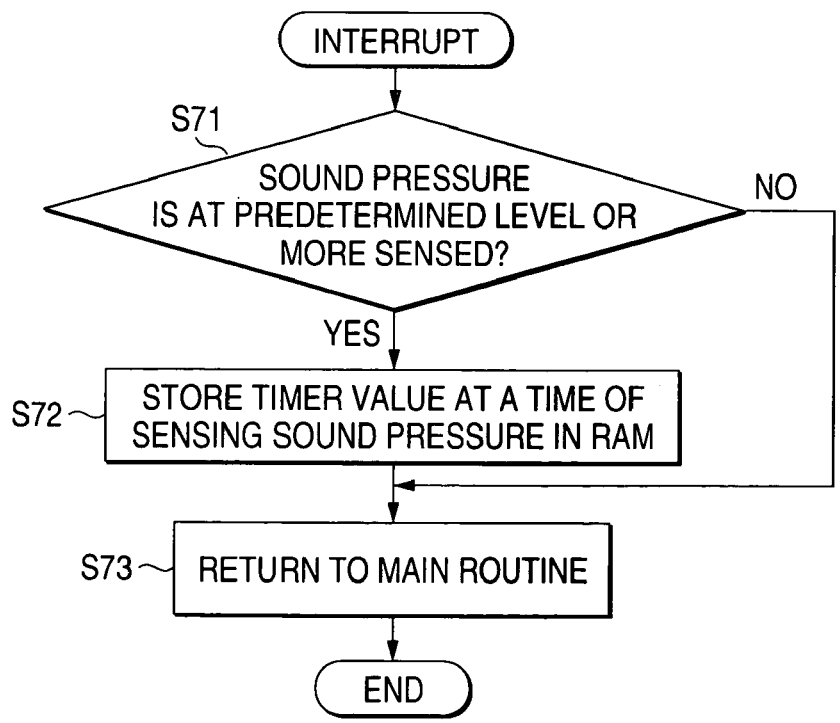
FIG. 12 is a flowchart showing an interrupt processing operation made by the microcomputer in the in-vehicle security device according to the embodiment (3).

FIG. 12 shows an interrupt processing operation made by the microcomputer 17B when the sound pressure sensor 14 senses a sound pressure.

First of all, at step S71, it is determined whether or not the sound pressure sensor 14 senses a sound pressure at a predetermined level (a level at which abnormality is detected) or more. If the sound pressure sensor senses the impact at the predetermined level or more, the operation proceeds to step S72.

At step S72, a timer value detected by the timer unit 17*f* when the sound pressure is sensed is stored in the RAM. Then, the operation proceeds to step S73. At step S73, the operation is returned to a main routine. Then, the operation is ended.

On the other hand, at step S71, if the sound pressure at the predetermined level or more is not sensed, the operation proceeds to step S73. Then, the operation is ended.

Figure 13:
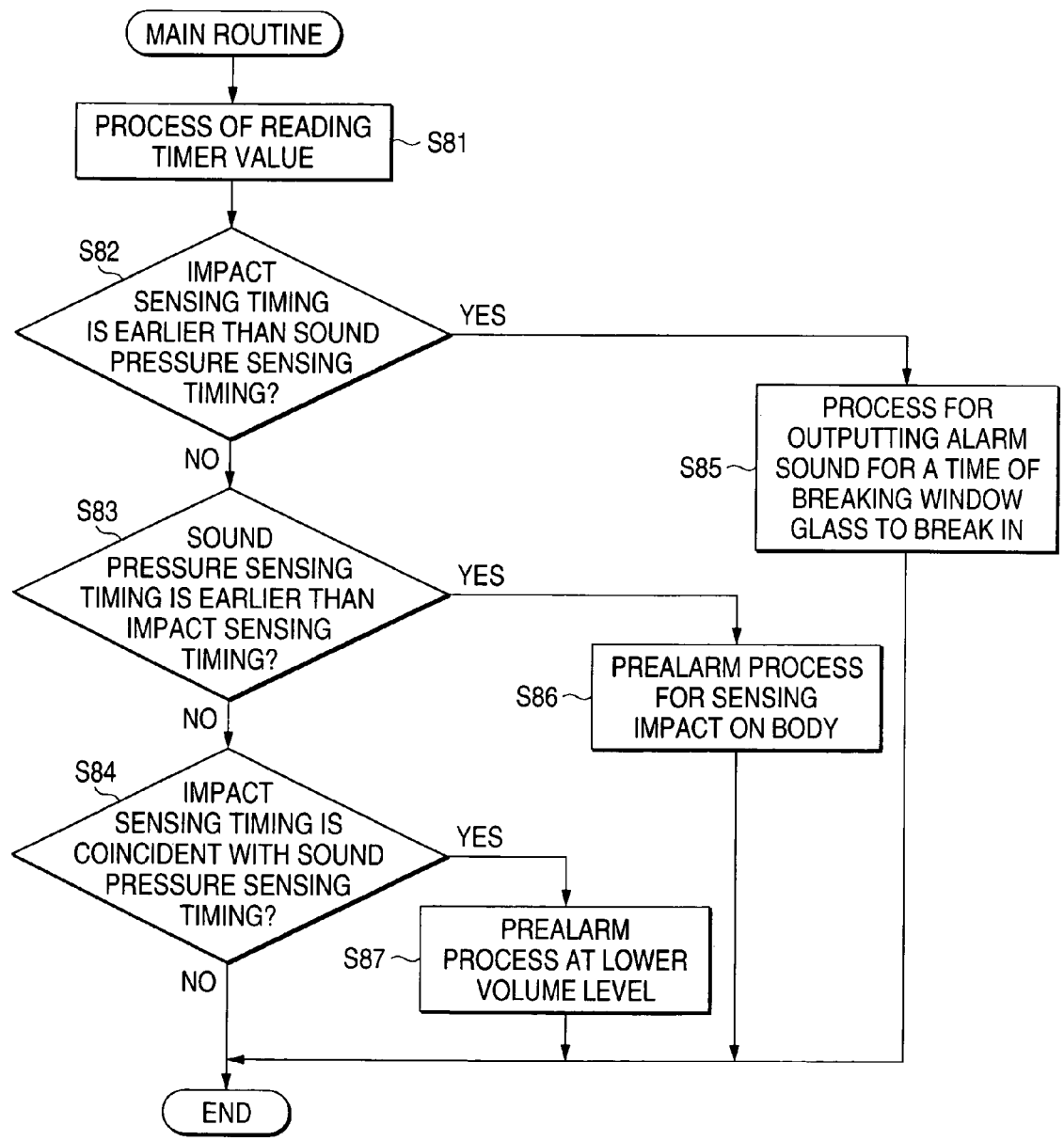
FIG. 13 is a flowchart showing a processing operation made by the microcomputer in the in-vehicle security device according to the embodiment (3).

FIG. 13 shows the main routine of an impacted object determination process made by the microcomputer 17B.

First of all, at step S81, the impact sensing timing and the sound pressure sensing timing are read from the RAM, and then the operation proceeds to step S82.

At step S82, it is determined whether or not the impact sensing timing is earlier than the sound pressure sensing timing. If it is concluded that the impact sensing timing is earlier than the sound pressure sensing timing, namely, that the impacted object is the window glass and the impact is caused by breaking the window glass to directly break into the vehicle, the operation proceeds to step S85.

At step S85, an alarm sound for the time of breaking the window glass to break-in (discouraging the vehicle intruder to conduct break-in). Then, the operation is ended.

On the other hand, at step S82, if it is concluded that the impact sensing timing is not earlier than the sound pressure sensing timing, the operation proceeds to step S83.

At step S83, it is determined whether or not the sound pressure sensing timing is earlier than the impact sensing timing. If it is concluded that the sound pressure sensing timing is earlier than the impact sensing timing, namely, the impact is not caused by breaking the window glass to directly break into the vehicle, the operation proceeds to step S86.

At step S86, a prealarm process for raising an alarm sound for the time of sensing the body impact is performed. Then, the operation is ended.

On the other hand, at step S83, if it is concluded that the sound pressure sensing timing is not earlier than the impact sensing timing, the operation proceeds to step S84.

At step S84, it is determined whether or not the impact sensing timing is coincident with the sound pressure sensing timing. If it is concluded that the impact sensing timing is coincident with the sound pressure sensing timing, the operation proceeds to step S87.

At step S87, a prealarm process for raising an alarm sound at a lower volume level than at step S86 is performed. Then, the operation is ended.

On the other hand, at step S84, if it is concluded that the impact sensing timing is not coincident with the sound pressure sensing timing, the operation is ended.

In the in-vehicle security device 10B according to the embodiment (3), it is possible to determine whether or not the impacted object is the window glass on the basis of a difference between the impact sensing timing of the impact sensing unit 13 and the sound pressure sensing timing of the sound pressure sensing unit 16, namely, a difference in propagation speed between the impact and the sound pressure.

For example, as means for breaking into a vehicle, a case of breaking the window glass is supposed. It is possible to correctly discriminate between a strong impact to break the window glass and a weak impact not to break the window glass or an impact on the body. Therefore, a precise alerting process corresponding to the discriminated impacted-body is performed without producing the false alarm.

Also, the impacted object determining unit 17*g* correctly determines that the impact is caused by breaking the window glass to break into the vehicle, because the impact sensing timing is earlier than the sound pressure sensing timing when a strong impact to break the window glass is applied to the window glass.

In this case, the alerting process unit 17*h* performs an effective alerting process corresponding to a breakage of the window glass. Therefore, a precise alarm is raised to the person trying to break into the vehicle by breaking the window glass, increasing the effect of deterring the intrusion act.

Also, when an impact is applied on the body other than the window glass, it is possible to correctly determine that the impact is applied on the body other than the window glass.

In this case, the alerting process unit 17*h* performs an effective alerting process corresponding to other than the window glass. Therefore, a precise alarm is raised to the person applying the impact on other than the window glass, increasing the effect of discouraging the intrusion act.

Figure 14:
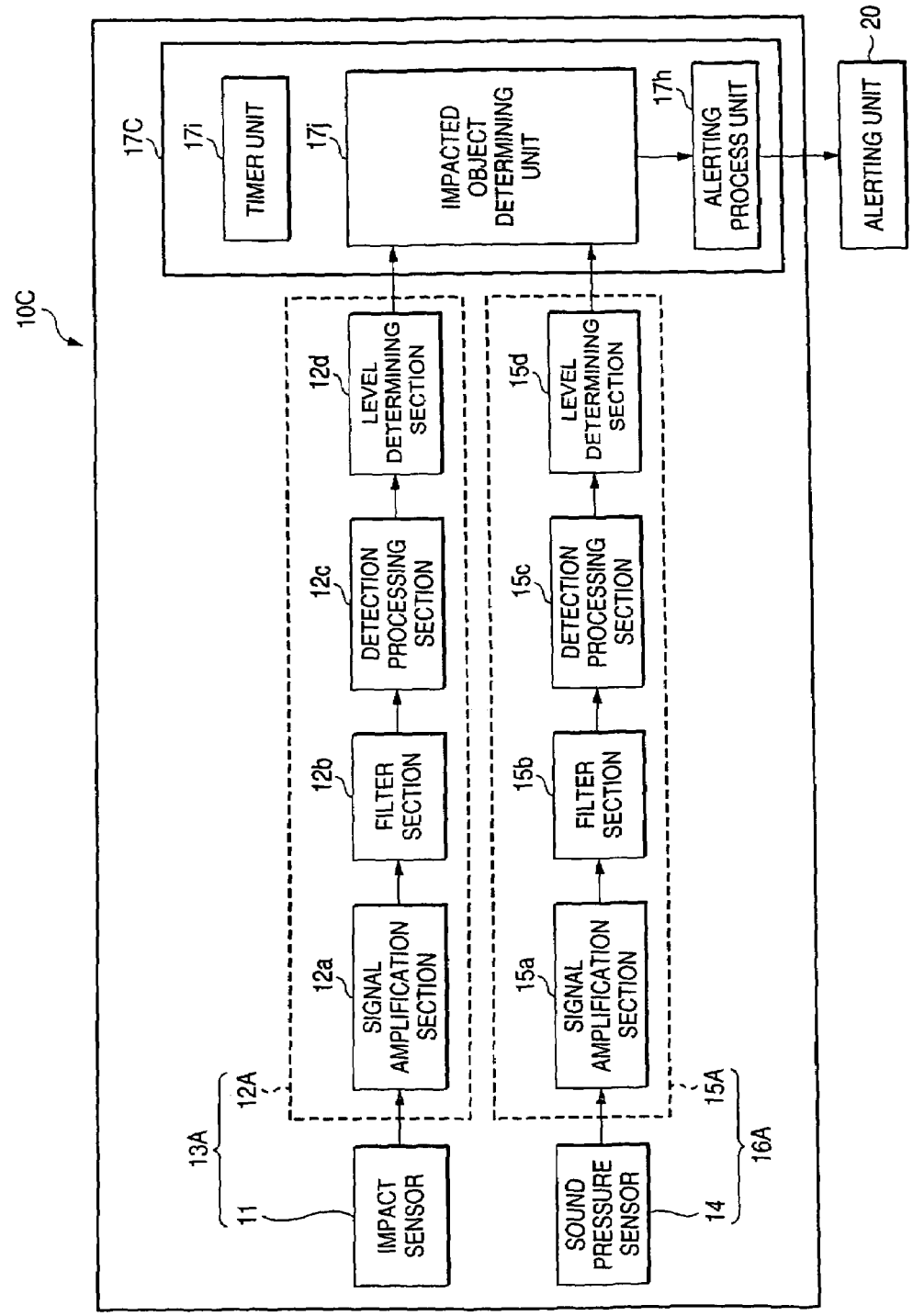
FIG. 14 is a block diagram schematically showing the essence of an in-vehicle security device according to the embodiment (3) of the invention.

FIG. 14 is a block diagram schematically showing the essence of an in-vehicle security device according to an embodiment (4) of the invention. The in-vehicle security device 10C according to the embodiment (4) has the almost same configuration as the in-vehicle security device 10A of FIG. 5, except for the microcomputer 17C. Herein, in the microcomputer 17C having different functions, different components are designated by different signs, and the description of other components is omitted.

The microcomputer 17C includes a timer unit 17*i*, an impacted object determining unit 17*j*, and an alerting process unit 17*h*. The timer unit 17*i* measures the impact sensing timing of an impact sensing signal output from the signal processing section 12A and the sound pressure sensing timing of a sound pressure sensing signal output from the signal processing section 15A. The impacted object determining unit 17*j* determines the impacted object (particularly whether the impact is applied on the window glass or the body) on the basis of the impact sensing timing and the sound pressure sensing timing clocked by the timer unit 17*i*, namely, on the basis of a difference in propagation speed between the impact and the sound pressure. The alerting process unit 17*h* performs a predetermined alerting process on the basis of a determination result of the impacted object by the impacted object determining unit 17*j*.

Referring to the flowcharts of FIGS. 15 and 16, the processing operation made by the microcomputer 17C in the in-vehicle security device 10C according to the embodiment (4) will be described below. A main routine is the almost same process as that shown in FIG. 13, and not described here.

Figure 15:
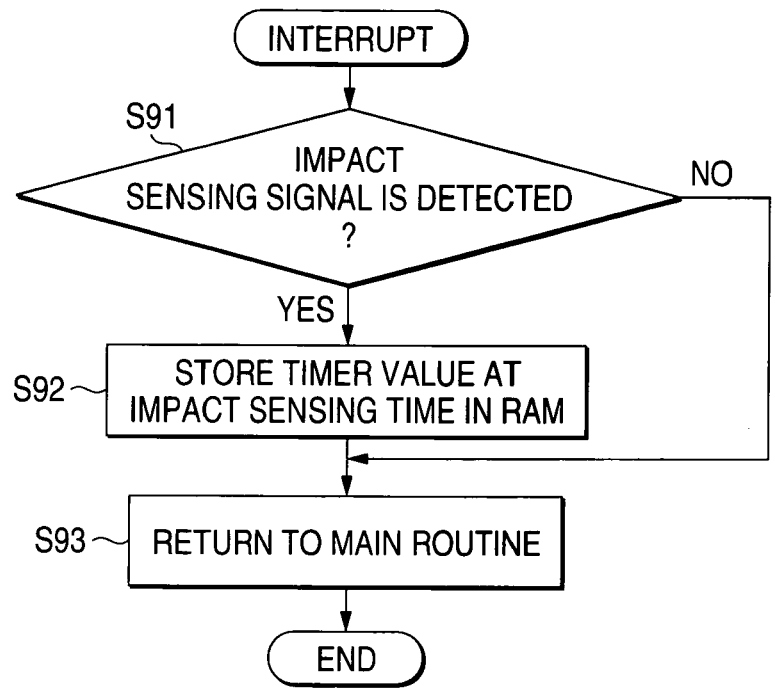
FIG. 15 is a flowchart showing an interrupt processing operation made by the microcomputer in the in-vehicle security device according to the embodiment (3).

FIG. 15 shows an interrupt processing operation made by the microcomputer 17C when the impact sensor 11 senses an impact.

First of all, at step S91, it is determined whether or not an impact sensing signal output from the signal processing means 12A is detected. If the impact sensing signal is detected, the operation proceeds to step S92.

At step S92, a timer value detected by the timer unit 17i when the impact is sensed is stored in the RAM. Then, the operation proceeds to step S93. At step S93, the operation is returned to a main routine. Then, the operation is ended.

On the other hand, at step S91, if the impact sensing signal is not detected, the operation proceeds to step S93. Then, the operation is ended.

Figure 16:
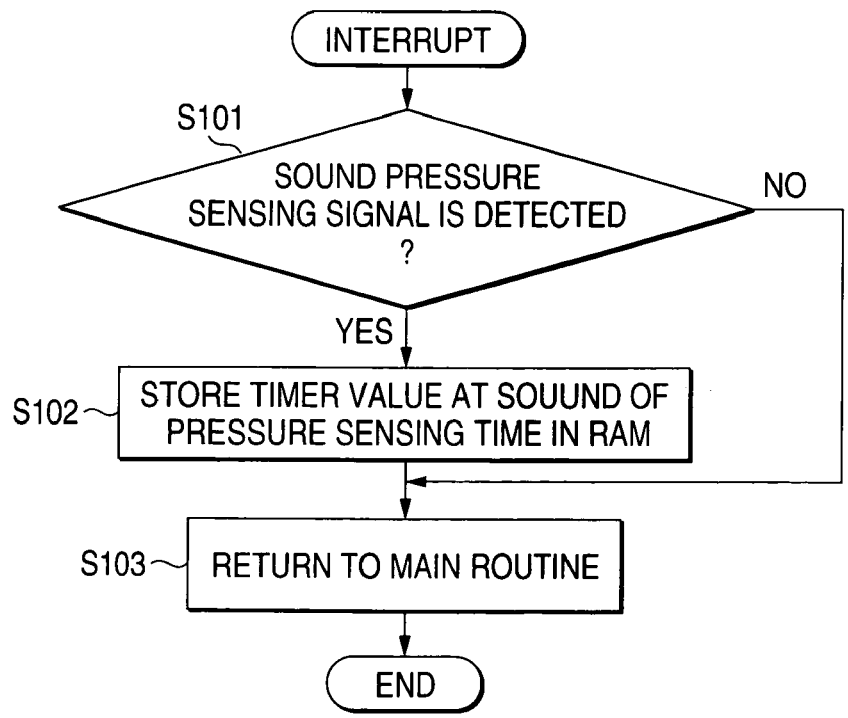
FIG. 16 is a flowchart showing an interrupt processing operation made by the microcomputer in the in-vehicle security device according to the embodiment (3).

FIG. 16 shows an interrupt processing operation made by the microcomputer 17C when the sound pressure sensor 14 senses a sound pressure.

First of all, at step S101, it is determined whether or not a sound pressure sensing signal output from the signal processing means 15A is detected. If the sound pressure sensing signal is detected, the operation proceeds to step S102.

At step S102, a timer value detected by the timer unit 17i when the sound pressure is sensed is stored in the RAM. Then, the operation proceeds to step S103. At step S103, the operation is returned to the main routine. Then, the operation is ended.

In the in-vehicle security device 10C according to the embodiment (4), it is possible to attain the almost same effects as the in-vehicle security device 10B according to the embodiment (3). Also, the microcomputer 17C stores the timer values when the impact sensing signal output from the signal processing means 12A and the sound pressure sensing signal output from the signal processing means 15A are detected, and determines the impacted object on the basis of the timer values. Therefore, there is no need to conduct the level determination process for waveform of signals detected by the impact sensor 11 and the sound pressure sensor 14, so that the microcomputer 17C is relieved of the processing load.

The security device may be constituted by a suitable combination of the embodiments (1) and (3), or the embodiments (2) and (4).

With this security device, the abnormal degree is determined on the basis of the level of the impact sensing signal detected by the impact sensor 11 and the level of the sound pressure sensing signal detected by the sound pressure sensor 14 in combination. Further, the impacted object is determined on the basis of a difference between the impact sensing timing of the impact sensor 11 and the sound pressure sensing timing of the sound pressure sensor 14, namely, a difference in propagation speed between the impact and the sound pressure. Accordingly, the determination precision can be greatly enhanced as compared with the conventional determination with the impact sensor alone. The enhanced determination precision can eliminate the false alarm. The precise alerting process corresponding to the abnormal degree and the impacted object can be performed.

In the above embodiments (1) to (4), the invention is applied to the in-vehicle security device. However, the security device of the invention is not limited to the vehicle mounted device. The invention may be also applied to a security device for a front door or window glass in a house or a building.

What is claimed is:

1. A security device comprising:
    an impact sensing unit for sensing an impact to output an impact sensing signal;
    a sound pressure sensing unit for sensing a sound pressure to output a sound pressure sensing signal;
    an abnormal degree determination unit for determining an abnormal degree on the basis of a level of the impact sensing signal and a level of the sound pressure sensing signal to output a determination result; and
    an alerting process unit for performing a predetermined alerting process on the basis of the determination result.

2. The security device according to claim 1, wherein the abnormal degree determination unit concludes that an illegal break-in is conducted when the level of the impact sensing signal is not less than a first predetermined value and the level of the sound pressure sensing signal is not less than a second predetermined value.

3. The security device according to claim 2, wherein the alerting process unit performs an alerting process corresponding to the illegal break-in.

4. The security device according to claim 1, wherein the abnormal degree determination unit concludes that the abnormal degree is not so severe as to lead to an illegal break-in when the level of the impact sensing signal is not less than a first predetermined value and the level of the sound pressure sensing signal is less than a second predetermined value.

5. The security device according to claim 4, wherein when the abnormal degree determination unit concludes that the abnormal degree is not so severe as to lead to the illegal break-in, the alerting process unit performs an alerting process with prealarm.

6. A security device comprising:
    an impact sensing unit for sensing an impact to output an impact sensing timing;
    a sound pressure sensing unit for sensing a sound pressure to output a sound pressure sensing timing;
    an impacted object determination unit for determining an impacted object on the basis of the impact sensing timing and the sound pressure sensing timing to output a determination result; and
    an alerting process unit for performing a predetermined alerting process on the basis of a determination result.

7. The security device according to claim 6, wherein when the impacted object determination unit concludes that the impact sensing timing is earlier than the sound pressure sensing timing, the impacted object determination unit concludes that the impacted object is a glass.

8. The security device according to claim 7, wherein when the impacted object determination unit concludes that the impacted object is the glass, the alerting process unit performs an alerting process corresponding to a breakage of the glass.

9. The security device according to claim 6, wherein when the impacted object determination unit concludes that the sound pressure sensing timing is earlier than the impact sensing timing, the impacted object determination unit concludes that the impacted object is other than a glass.

10. The security device according to claim 9, wherein when the impacted object determination unit concludes that the impacted object is other than the glass, the alerting process unit performs an alerting process corresponding to a portion other than the glass.

11. A security device comprising:

an impact sensing unit for sensing an impact to output an impact sensing signal and an impact sensing timing;

a sound pressure sensing unit for sensing a sound pressure to output a sound pressure sensing signal and a sound pressure sensing timing;

an abnormal degree determination unit for determining an abnormal degree on the basis of a level of the impact sensing signal and a level of the sound pressure sensing signal to output a first determination result;

an impacted object determination unit for determining an impacted object on the basis of the impact sensing timing and the sound pressure sensing timing to output a second determination result; and an alerting process unit for performing a predetermined alerting process on the basis of the first determination result and the second determination result.

* * * * *